Patented Dec. 16, 1947

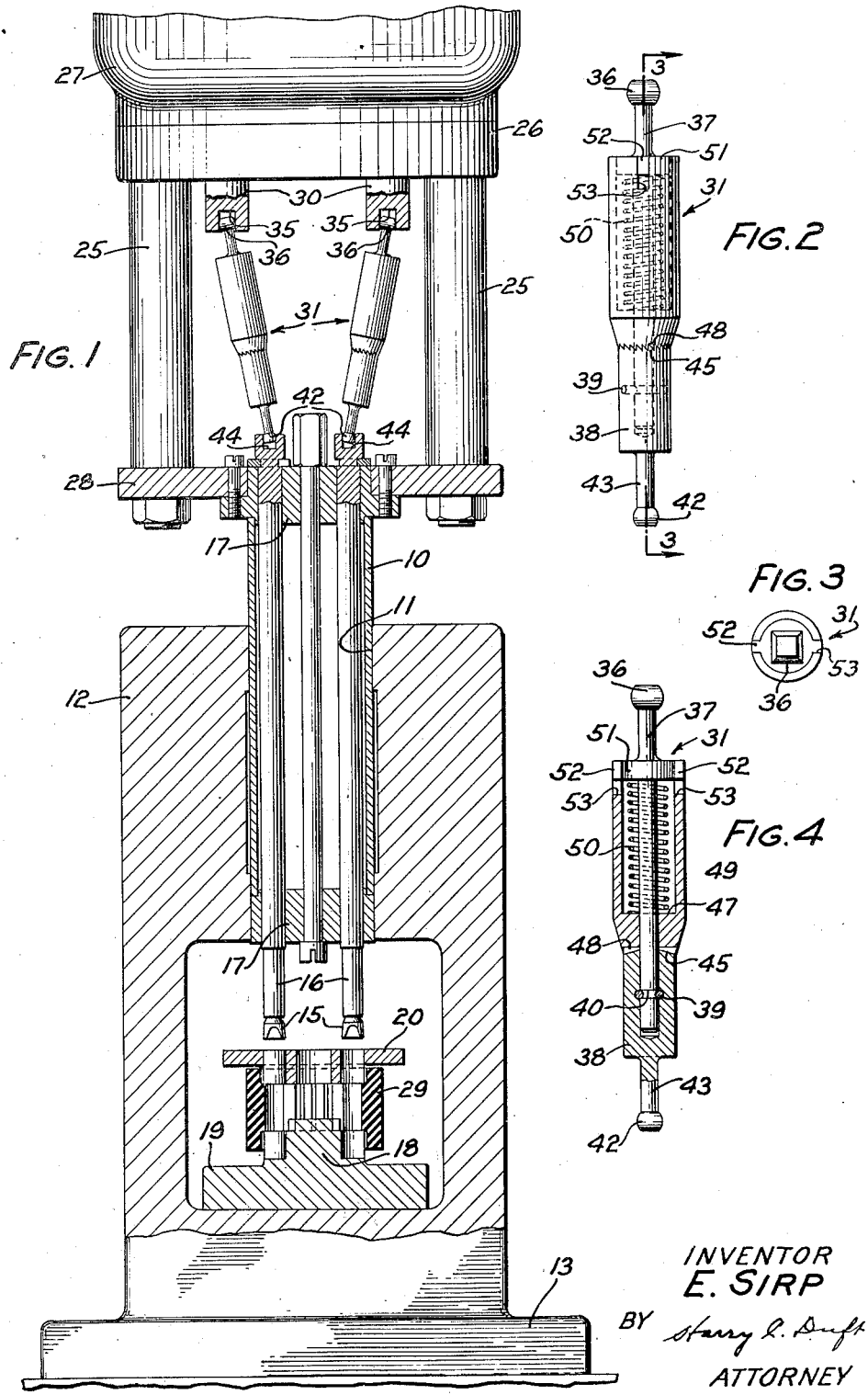

2,432,633

UNITED STATES PATENT OFFICE 2,432,633

OVERLOAD RELEASE COUPLING

Emil Sirp, Downers Grove, Ill., assignor to Western Electric Company, Incorporated, New York, N. Y., a corporation of New York Application April 30, 1943, Serial No. 485,117

1 Claim. (Cl. 64—29)

This invention relates to article working apparatus and more particularly to high precision boring apparatus.

An object of the present invention is to provide an effective and efficient boring apparatus.

In accordance with one embodiment of this invention, an apparatus may be provided in which a plurality of cutting tools are fixed to the lower ends of a plurality of rotatable spindles and the upper ends of the spindles are drivably connected to a plurality of power shafts by universal connecting members having ratchet members associated therewith so that, when the cutting pressure exceeds a certain amount, the ratchets will slip and produce a noise which serves as a signal.

Other objects and advantages of this invention will be more apparent from the following detailed description taken in conjunction with the drawings, wherein:

Fig. 1 is a side elevation, partly in section, of a boring apparatus constructed in accordance with the present invention;

Fig. 2 is an enlarged elevation of a universal connecting member used with this apparatus;

Fig. 3 is a sectional view along the line 3—3 of Fig. 2; and

Fig. 4 is a plan view of the member shown in Fig. 2.

In the embodiment of this invention shown in the drawings, a tubular spindle housing 10 is slidably positioned in a cylindrical aperture 11 of a guide block 12 which is mounted on a base 13 of the apparatus. A plurality of cutting tools 15 are mounted on spindles 16 which are journalled in bearings 17 at either end of the tubular housing 10. An article supporting block 18 is positioned beneath the cutting tools and is mounted on a platform 19 integrally formed with the base 13 of the apparatus and a plate 20 is associated with the block 18 and movable by means (not shown) to clamp an article on the block.

The spindle housing 10 is supported by a number of posts 25, the upper ends of which are fixed to a rotatable collar 26 of a reciprocable power head 27, and the lower ends of which are fixed to a cross plate 28, which is mounted on the housing. Reciprocation of the power head 27 thus causes the cutting tools to move up or down with respect to an article 29 mounted on the block 18. A more detailed description of the foregoing apparatus will be found in the co-pending application of E. Sirp and J. S. Stull, Serial No. 485,118, filed April 30, 1943.

The cutting tools 15 are rotated by power shafts 30 mounted in the power head 27, the shafts 30 being connected to the upper ends of the cutting tool spindles by connecting members 31. During the boring operation, the cutting tools may become dull or may encounter burrs which tend to reduce the boring rate of one or more of the cutting tools. Since the cutting tools are moved downwardly as a unit while being rotated, should one tool cut less rapidly than the others, the increased pressure might cause damage to the tool or to the entire apparatus. In the present apparatus, the connecting members 31, which are shown in detail in Figs. 2 and 3, are designed to prevent the possibility of damage to the apparatus should one or more of the cutting tools fail to operate properly. As may be seen in Fig. 1, the lower ends of the power shafts 30 are provided with squared recesses 35 in which are positioned knob-like, quasi-spherical members 36, as shown in Fig. 4, square in cross section, but having vertically rounded sides to provide a universal driving connection with the shafts 30.

Each member 36 is integrally formed with the upper end of a rod 37, the lower end of which extends into a cylindrical block 38, as shown in Figs. 2 and 3, and is rotatably held therein by pins 39 which are mounted in the block and which engage an annular groove 40 formed in the lower end of the rod 37. A second quasi-spherical member 42 of the same shape as the member 36 is mounted on a rod 43 which is fixed to and extends from the lower end of the cylindrical block 38. This member 42 is adapted to be positioned in a squared recess 44, formed in the upper end of each cutting tool spindle 16, and when the cylindrical block 38 is rotated, causes the associated spindle also to be rotated.

In order to rotate the block 38 and the spindle driving member 42, the upper surface of the block 38 is serrated to form teeth 45 which are engageable with teeth 48 formed in the lower end of a sleeve 49. The lower portion of this sleeve is shouldered, as may be seen in Fig. 4, to provide a base 47 for a helically coiled spring 50 which is positioned about the rod 37, this spring being retained in the sleeve 49 by a flange 51 which is integrally formed with the upper portion of the rod 37 and fits closely within the upper end of the sleeve 49. Lugs 52, integrally formed on opposite sides of the flange 51, are slidably positioned in vertically disposed slots 53 formed in the upper portion of the sleeve 49 so that, as the rod 37 is rotated by a shaft 30, the sleeve 49 will also be rotated. The spring 50 yieldably forces the teeth 48, formed at the lower end of the sleeve 49, into driving engagement with the teeth 44 of the block 38 and maintains a driving relationship therebetween until the resistance to rotation exceeds a certain predetermined amount, as for example, when the cutting tool encounters a burr. When the resistance to rotation exceeds this predetermined amount, the spring 50 will yield and permit the teeth to slip. This slipping causes the rotation of the cutting tool associated with this connecting member 31 to cease and creates a noise which serves as a signal to attract the attention of an operator who may then stop the machine and correct the difficulty.

While the present invention has been described in connection with a boring apparatus, it will be apparent that this type of connecting member is adapted to be used in many other types of apparatus and particularly where a yieldable driving connection is required, and where, at the same time, it is also desired to indicate to an operator that the apparatus being driven is not operating properly.

What is claimed is:

In an apparatus having a cutting tool mounted on a spindle shaft and a power shaft for driving said spindle shaft, an overload release device for drivingly connecting said power shaft to said spindle shaft and for disconnecting said drive when said spindle shaft is overloaded comprising a clutch element having ratchet teeth thereon, a rod rotatably secured to said clutch element, an axially movable clutch element mounted on said rod and having cooperating ratchet teeth thereon for engaging the teeth on said first clutch element, a sleeve formed on and extending axially from said movable clutch element and having an axial slot therein, shoulder means on said rod slidably engageable in said slot to form a driving connection between said rod and said sleeve, a spring enclosed within said sleeve and reacting against the shoulder means for urging said movable clutch element into engagement with said first clutch element, and means for connecting the spindle shaft to one of the clutch elements and the power shaft to the said rod.

EMIL SIRP.

REFERENCES CITED

The following references are of record in the file of this patent:

UNITED STATES PATENTS

| Number | Name | Date |
|---|---|---|
| 1,232,779 | Ewart | July 10, 1917 |
| 1,867,508 | Huber | July 12, 1932 |
| 1,681,288 | Galloway | Aug. 21, 1928 |
| 1,948,507 | Carlson | Feb. 27, 1934 |
| 1,121,992 | Eden, Jr. | Dec. 22, 1914 |
| 1,821,543 | Coultas | Sept. 1, 1931 |
| 681,476 | Flautt | Aug. 27, 1901 |
| 1,035,547 | Leeuw | Aug. 13, 1912 |
| 514,990 | Habersang et al. | Feb. 20, 1894 |
| 521,677 | Smith | June 19, 1894 |